(12) United States Patent
Tian et al.

(10) Patent No.: US 10,620,642 B2
(45) Date of Patent: Apr. 14, 2020

(54) AIRCRAFT AND ROLL METHOD THEREOF

(71) Applicant: Yuneec Technology Co., Limited, Hong Kong (CN)

(72) Inventors: Yu Tian, Jiangsu (CN); Wenyan Jiang, Jiangsu (CN)

(73) Assignee: Yuneec Technology Co., Limited, Hong Kong (CN)

( * ) Notice: Subject to any disclaimer, the term of this patent is extended or adjusted under 35 U.S.C. 154(b) by 203 days.

(21) Appl. No.: 15/557,092

(22) PCT Filed: Mar. 11, 2016

(86) PCT No.: PCT/CN2016/076115
§ 371 (c)(1),
(2) Date: Sep. 9, 2017

(87) PCT Pub. No.: WO2016/141888
PCT Pub. Date: Sep. 15, 2016

(65) Prior Publication Data
US 2018/0046200 A1    Feb. 15, 2018

(30) Foreign Application Priority Data
Mar. 12, 2015   (CN) .......................... 2015 1 0108721

(51) Int. Cl.
*G05D 1/08* (2006.01)
*B64C 27/08* (2006.01)
(Continued)

(52) U.S. Cl.
CPC ........... *G05D 1/0858* (2013.01); *B64C 27/08* (2013.01); *B64C 39/024* (2013.01);
(Continued)

(58) Field of Classification Search
CPC .................................................. G05D 1/0858
See application file for complete search history.

(56) References Cited

U.S. PATENT DOCUMENTS 10,101,736 B1 * 10/2018 Beard ...................... B64C 13/50
2014/0099853 A1    4/2014 Condon et al.
2015/0057844 A1 *  2/2015 Callou ................. G05D 1/0204
701/3

FOREIGN PATENT DOCUMENTS

CN    0743582 A2    11/1996
CN    201429796 Y    3/2010
(Continued)

OTHER PUBLICATIONS

The extended European search report dated Oct. 26, 2018 for European application No. 16761115.1, 15 pages.
(Continued)

*Primary Examiner* — Imran K Mustafa
(74) *Attorney, Agent, or Firm* — Law Offices of Liaoteng Wang

(57) ABSTRACT

An aircraft and a roll method thereof. The aircraft comprises an aircraft body and a remote control, a motor, a power supply, a controller, a six-axis inertial sensor and an H-bridge chip. The remote control is configured for a user to input a desired inclination angle of the aircraft, and transmit the desired inclination angle to the controller, the desired inclination angle being 180° or 360°. The six-axis inertial sensor is configured to detect a current real-time inclination angle of the aircraft relative to a horizontal plane, and transmit the real-time inclination angle to the controller. The controller is configured to compute a difference value between the desired inclination angle and the real-time inclination angle, and compute a roll voltage according to the difference value. The controller is further configured to control the H-bridge chip so that the roll voltage is input to the motor.

20 Claims, 3 Drawing Sheets

(51) Int. Cl.
  *B64C 39/02* (2006.01)
  *G05D 1/00* (2006.01)
  *B64C 29/02* (2006.01)
(52) U.S. Cl.
  CPC ............ *G05D 1/0011* (2013.01); *B64C 29/02* (2013.01); *B64C 2201/027* (2013.01); *B64C 2201/042* (2013.01); *B64C 2201/108* (2013.01); *B64C 2201/146* (2013.01)

(56) References Cited

FOREIGN PATENT DOCUMENTS

| CN | 102955477 A | 3/2013 |
| CN | 103365296 A | 10/2013 |
| CN | 203332391 U | 12/2013 |
| CN | 203705964 U | 7/2014 |
| CN | 203909620 U | 10/2014 |
| WO | WO03067351 A2 | 8/2003 |

OTHER PUBLICATIONS

PCT International Search Report for PCT/CN2016/076115, dated Jun. 15, 2016.
Office Action and first search report dated Feb. 24, 2018 for Chinese Application No. 201510108721.9, 6 pages.

\* cited by examiner

AIRCRAFT AND ROLL METHOD THEREOF

CROSS REFERENCE

The present disclosure is the U.S. National Phase of International Application No. PCT/CN2016/076115, filed on Mar. 11, 2016 and published in Chinese, which claims the benefit of and priority to the Chinese Application No. 201510108721.9 filed on Mar. 12, 2015, which is entirely incorporated herein by reference.

TECHNICAL FIELD

The present disclosure relates to an aircraft, especially a four-rotor aircraft, a six-rotor aircraft or an eight-rotor aircraft and a roll method thereof.

BACKGROUND

A conventional four-rotor aircraft, six-rotor aircraft or eight-rotor aircraft can merely perform some simple flight actions due to limitations of aerodynamic structures. Multiple additional mechanical structures need to be added when difficult flight actions (such as roll and "swing" action of the aircraft body) need to be performed, which results in particularly complicated mechanical structures of the aircraft.

For example, four propellers are used to provide a lifting force in the four-rotor aircraft. In such a case, real-time computation is made based on data from sensors in the aircraft body, then an aircraft attitude (i.e., a roll angle of the aircraft relative to a horizontal plane) is estimated by using an inertial navigation algorithm, and speeds of four motors for providing the lifting force are respectively adjusted according to a current roll angle of the aircraft body. Propellers have to output a thrust force in a direction opposed to an original direction, when the aircraft need to fly with a roll angle of 180°. In known technical solutions, generally, propellers are separated into two parts which are able to move independent of each other, and the direction of the thrust force output from the propellers can be directly changed by changing pitches of propellers via a steering engine and a number of transmission mechanisms. The existing solutions need additional complex transmission mechanisms, thereby increasing the complexity of the structure of the aircraft. Furthermore, transmission mechanism needs to be manually debugged during production, and even a slight impact may affect the stability of the complex transmission mechanisms in use.

SUMMARY

A technical problem to be solved by the present disclosure is to overcome the disadvantage that additional complex transmission mechanisms in the aircraft are required to perform a roll of the aircraft, which will result in a complex structure of the aircraft, and the present disclosure provides an aircraft and a roll method thereof, wherein the roll of the aircraft can be achieved by a forward and reverse rotation of a motor without additional complex transmission mechanisms.

The above technical problem is solved by technical solutions of the present disclosure as follows.

The present disclosure provides an aircraft, which comprises an aircraft body and a remote control, wherein the aircraft body comprises a motor and a power supply, characterized in that, the aircraft body further comprises a controller, a six-axis inertial sensor and an H-bridge chip which is configured to be electrically connected in parallel to the motor;

the remote control is configured for a user to input a desired roll angle of the aircraft, and is configured to transmit the desired roll angle to the controller, wherein the desired roll angle is 180° or 360°;

the six-axis inertial sensor is configured to detect a current real-time roll angle of the aircraft relative to a horizontal plane, and transmit the real-time roll angle to the controller;

the controller is configured to calculate a difference valve between the desired roll angle and the real-time roll angle, and calculate a reverse-rotation voltage according to the difference value; and the controller is further configured to control the H-bridge chip so that the reverse-rotation voltage is input to the motor, causing a reverse rotation of the motor and thus a roll of the aircraft to an attitude with a roll angle of 180° or 360°. That is to say, a roll of the aircraft in the sky can be achieved by a forward and reverse rotation of the motor.

Preferably, the controller is further configured to control the H-bridge chip to generate an electromagnetic barking force to decelerate the motor. A speed of the motor may decrease dramatically after a short time period (for example, 50 milliseconds). Then, the motor rotates reversely according to the input reverse-rotation voltage.

Preferably, the controller is further configured to control the H-bridge chip to change a value and direction of a voltage input to the motor from the power supply, causing the motor to operate with a constant or increased speed. That is to say, both a stable operation and accelerated operation of the motor can be achieved by controlling the H-bridge chip.

Preferably, when the desired roll angle is 360°, a value of i is set to be 1; the remote control is configured to receive an input of an i-th roll angle and transmit the i-th roll angle to the controller;

the six-axis inertial sensor is configured to detect an i-th current real-time roll angle of the aircraft relative to the horizontal plane, and transmit the i-th real-time roll angle to the controller;

the controller is configured to calculate a difference value between the i-th roll angle input and the i-th real-time roll angle, and calculate a voltage according to the difference value, wherein the voltage is a reverse-rotation voltage when the i-th roll angle is between 90° and 180°;

the controller is further configured to control the H-bridge chip so that the voltage is input to the motor; and the controller is further configured to determine whether the i-th roll angle is 360°, if so, it comes to an end, and if not, the value of i is increased by 1 and the remote control is called.

In the present technical solution, when a user intends to roll an aircraft to an attitude with a roll angle of 360°, the user may at first input a smaller roll angle, for example, 45° on the remote control, instead of directly inputting 360° on the remote control to directly roll the aircraft to the attitude with the roll angle of 360° in the sky. Then, a voltage may be output based on the control of the controller, and roll the aircraft to an attitude with the roll angle of 45° in the sky. Then, the user may again input a roll angle, which is larger than the previously input roll angle, for example, 90° and the aircraft will roll in the sky to an attitude with the roll angle of 90° within a short time period. Then, the user may input a roll angle of 135°, 180°, 225° and 360° in turn, and finally, the aircraft can roll in the sky to the attitude with the roll angle of 360°.

The roll of the aircraft to the attitude with the roll angle of 360° is achieved by six steps. Such a technical solution has the following advantages: (1) by preventing the aircraft from rolling too fast, which may result in a bad visual experience and thus a false impression of the user that the aircraft fails to roll, an "elegant" roll of the aircraft and a good visual experience can be achieved; and (2) by preventing the aircraft from rolling too fast and too strongly, a fall of the aircraft can be prevented.

Preferably, the aircraft is a four-rotor aircraft, a six-rotor aircraft or an eight-rotor aircraft.

The present disclosure further provides a roll method of an aircraft, characterized in that, the method can be performed by the aircraft as described above and comprises steps of:

$S_1$, inputting a desired roll angle of the aircraft by a user on the remote control, and transmitting the desired roll angle to the controller by the remote control, wherein the desired roll angle is 180° or 360°;

$S_2$, detecting a current real-time roll angle of the aircraft relative to a horizontal plane is and transmitting the real-time roll angle to the controller by the six-axis inertial sensor;

$S_3$, calculating a difference value between the desired roll angle and the real-time roll angle and calculating a reverse-rotation voltage according to the difference value; and $S_4$, controlling the H-bridge chip by the controller so that the reverse-rotation voltage is input to the motor.

Preferably, in $S_4$, the H-bridge chip is controlled by the controller to generate an electromagnetic braking force to decelerate the motor.

Preferably, the H-bridge chip is controlled by the controller to change a value and direction of a voltage input to the motor from the power supply, causing the motor to operate with a constant or increased speed.

Preferably, when the desired roll angle is 360°, a value of i is set to be 1, and the roll method comprises steps of:

$S_1'$, receiving an input of an i-th roll angle and transmitting the i-th roll angle to the controller by the remote control;

$S_2'$, detecting an i-th current real-time roll angle of the aircraft relative to a horizontal plane and transmitting the i-th real-time roll angle to the controller by the six-axis inertial sensor;

$S_3'$, calculating a difference value between the i-th roll angle input and the i-th real-time roll angle and calculating a voltage according to the difference value by the controller, wherein the voltage is a reverse-rotation voltage when the i-th roll angle is between 90° and 180°;

$S_4'$, controlling the H-bridge chip by the controller so that the voltage is input to the motor; and $S_5'$, determining whether the i-th roll angle is 360° by the controller, if so, it comes to an end, and if not, the value of i is increased by 1 and $S_1'$-$S_4'$ are performed again.

Various preferable embodiments of the present disclosure can be obtained by any combination of the above preferable conditions, based on common knowledge in the technical field.

Beneficial effects of the present disclosure lie in the following aspects: a roll of an aircraft can be achieved by a forward and reverse rotation of a motor instead of complex transmission mechanisms; furthermore, debug of the aircrafts can be omitted in the case of mass production without deterioration of a durability compared to conventional aircrafts; and the aircraft of the present disclosure can greatly play a dynamic performance of a conventional aircraft, improving interestingness and economical efficiency of the aircraft as a model aircraft equipment.

DETAILED DESCRIPTION

In the following, to more clearly illustrate the object, technical solutions and advantages of embodiments of the present disclosure, the technical solutions of embodiments of the present disclosure will be clearly and thoroughly described by reference to appended drawings of embodiments of the present disclosure. Obviously, the embodiments described are only a part, rather than all, of embodiments of the present disclosure. All the embodiments obtained by a person skilled in the art without inventive work based on the embodiments of the present disclosure fall within the scope of the present disclosure.

Embodiment 1

Figure 1:
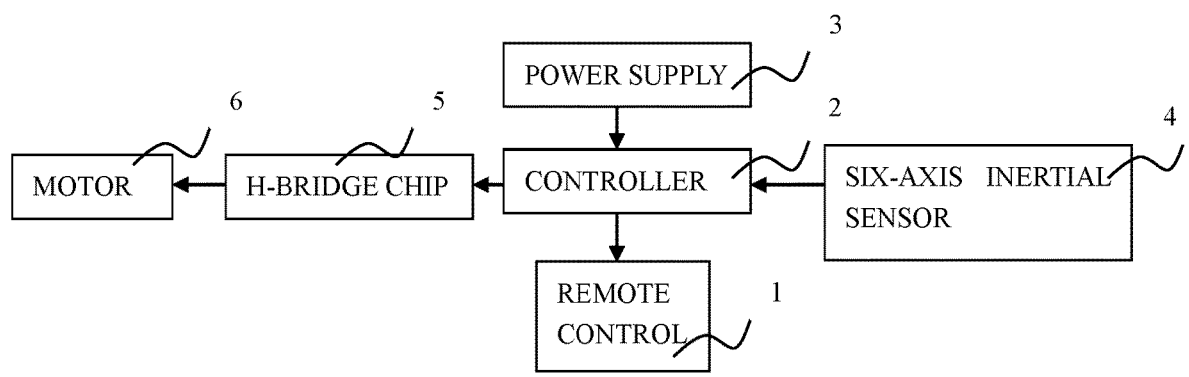
FIG. 1 schematically shows a structural diagram of an aircraft according to Embodiment 1 of the present disclosure.

The present embodiment provides an aircraft, which is a four-rotor aircraft, a six-rotor aircraft or an eight-rotor aircraft. As shown in FIG. 1, the aircraft includes an aircraft body (not shown in FIG. 1) and a remote control 1, wherein the aircraft body includes a controller 2, a power supply (for example, a lithium battery) 3, a six-axis inertial sensor 4, a motor 6 and an H-bridge chip 5 which is configured to be electrically connected in parallel to the motor 6.

Functions of individual components of the aircraft will be described in detail as follows:

The remote control 1 is configured for a user to input a desired roll angle of the aircraft, and is configured to transmit the desired roll angle to the controller 2, wherein the desired roll angle is 180° or 360°;

The six-axis inertial sensor 4 is configured to detect a current real-time roll angle of the aircraft relative to a horizontal plane, and transmit the real-time roll angle to the controller 2;

The controller 2 is configured to calculate a difference value between the desired roll angle and the real-time roll angle, and then calculate a reverse-rotation voltage according to the difference value;

The controller 2 is further configured to control the H-bridge chip 5 so that the reverse-rotation voltage is input to the motor 6, causing a reverse rotation of the motor 6 and thus a roll of the aircraft to an attitude with the roll angle of 180° or 360°. That is to say, the roll of the aircraft in the sky is achieved by a forward and reverse rotation of the motor.

The controller 2 is further configured to control the H-bridge chip 5 to generate an electromagnetic braking torque for decelerating the motor 6. A speed of the motor can be reduced dramatically within a short time period (for example, 50 milliseconds). Then, the motor can rotate reversely according to the input reverse-rotation voltage.

Furthermore, both a stable operation and accelerated operation of the motor 6 can be achieved by controlling the H-bridge chip 5. Specifically, the controller 2 is configured to control the H-bridge chip 5 to change a value and direction of a voltage input to the motor 6 from the power supply so that the motor 6 can operate with a constant or increased speed. For example, the H-bridge chip 5 can be controlled to increase the input voltage so that the motor 6 can operate with the increased speed. For example, the H-bridge chip 5 can be controlled to keep the input voltage constant so that the motor 6 can operate with the constant speed.

Figure 2:
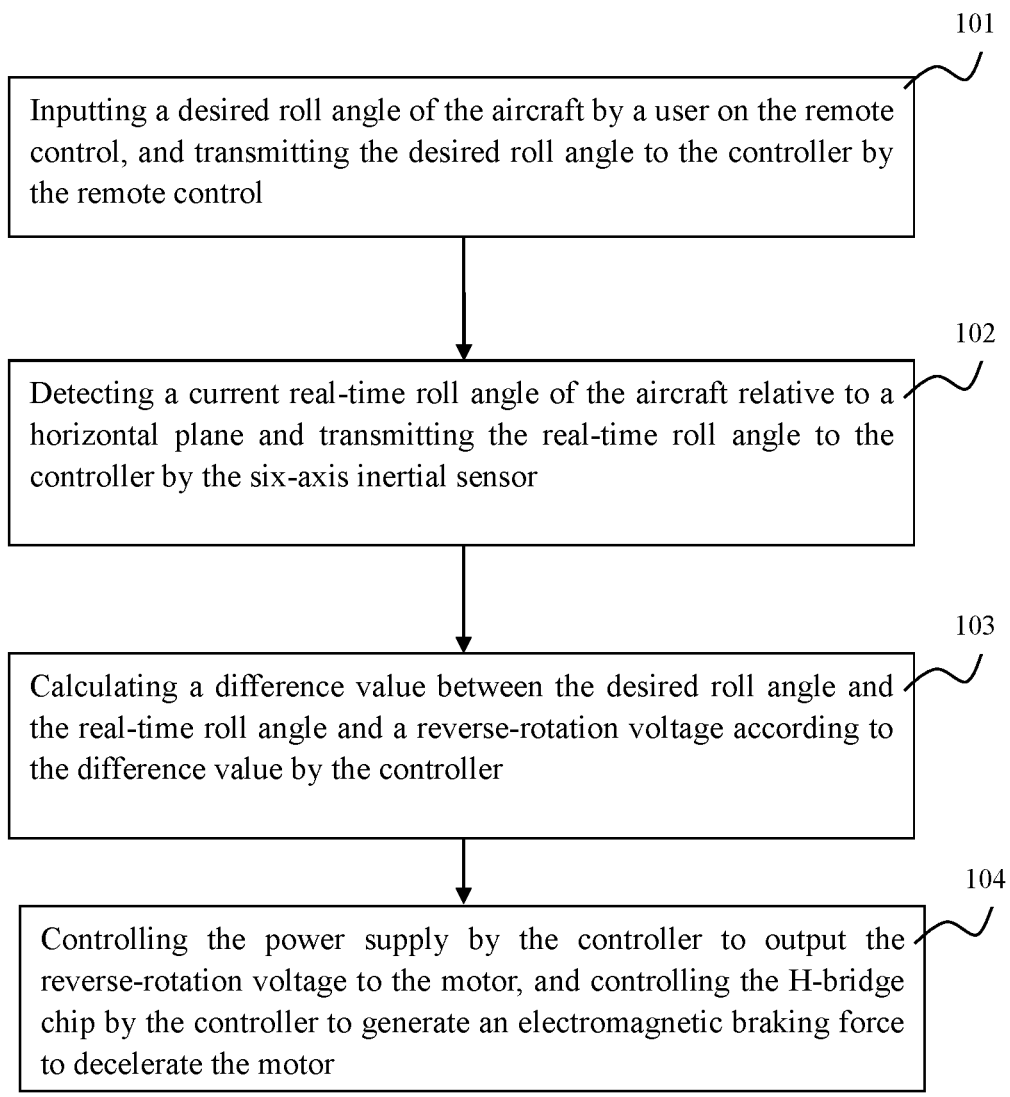
FIG. 2 schematically shows a roll method of the aircraft according to the Embodiment 1 of the present disclosure.

As shown in FIG. 2, the present embodiment further provides a roll method of an aircraft, which can be achieved by use of the above-described aircraft and includes steps as follows:

Step 101, inputting a desired roll angle of the aircraft by a user on the remote control, and transmitting the desired roll angle to the controller by the remote control, wherein the desired roll angle is 180° or 360°;

Step 102, detecting a current real-time roll angle of the aircraft relative to a horizontal plane by the six-axis inertial sensor, and transmitting the real-time roll angle to the controller by the six-axis inertial sensor;

Step 103, calculating a difference value between the desired roll angle and the real-time roll angle and calculating a reverse-rotation voltage according to the difference value by the controller;

Step 104, controlling the H-bridge chip by the controller so that the reverse-rotation voltage is input to the motor, and controlling the H-bridge chip by the controller to generate an electromagnetic braking torque for decelerating the motor.

In the following, a specific example is provided for a person skilled in the art to better understand the present disclosure.

A user may input 180° or press a button indicating 180° on the remote control 1, when the user intends to roll an aircraft in the sky to an attitude with a roll angle of 180°. The remote control 1 may transmit the roll angle of 180° to the controller 2 after receiving the roll angle of 180° input by the user. Meanwhile, the six-axis inertial sensor 4 may detect the current real-time roll angle of the aircraft relative to the horizontal plane (for example, 30°), and transmit the real-time roll angle to the controller 2.

The controller 2 may calculate the difference value (that is, 150°) between the desired roll angle of 180° and the real-time roll angle of 30°, and calculate a reverse-rotation voltage according to the difference value of 150°. Then, the controller 2 may control the H-bridge chip 5 so that the reversed-rotation voltage is input to the motor 6, causing the reverse rotation of the motor 6 and thus the roll of aircraft to the attitude with the roll angle of 180°.

Embodiment 2

The aircraft of the present embodiment has the same structure as that in the Embodiment 1, and the roll method of the aircraft in the sky to an attitude with a roll angle of 180° in the present embodiment is also the same as that in the Embodiment 1. The present embodiment differs from the Embodiment 1 in the roll method of the aircraft in the sky to an attitude with a roll angle of 360°.

Specifically, when the desired roll angle is 360°, a value of i is set to be 1, wherein the remote control is configured to receive an input of an i-th roll angle and transmit the roll angle to the controller.

The six-axis inertial sensor is configured to detect an i-th current real-time roll angle of the aircraft relative to the horizontal plane, and transmit the i-th real-time roll angle to the controller.

The controller is configured to calculate a difference value between the i-th roll angle and the i-th real-time roll angle, and calculate a voltage according to the difference value. The voltage is a reverse-rotation voltage when the i-th roll angle is in a range from 90° to 180°.

The controller is further configured to control the H-bridge chip so that the voltage is input to the motor.

The controller is further configured to determine whether the i-th roll angle is 360°. If so, it comes to an end. If not, a value of i is increased by one and the remote control is called.

Figure 3:
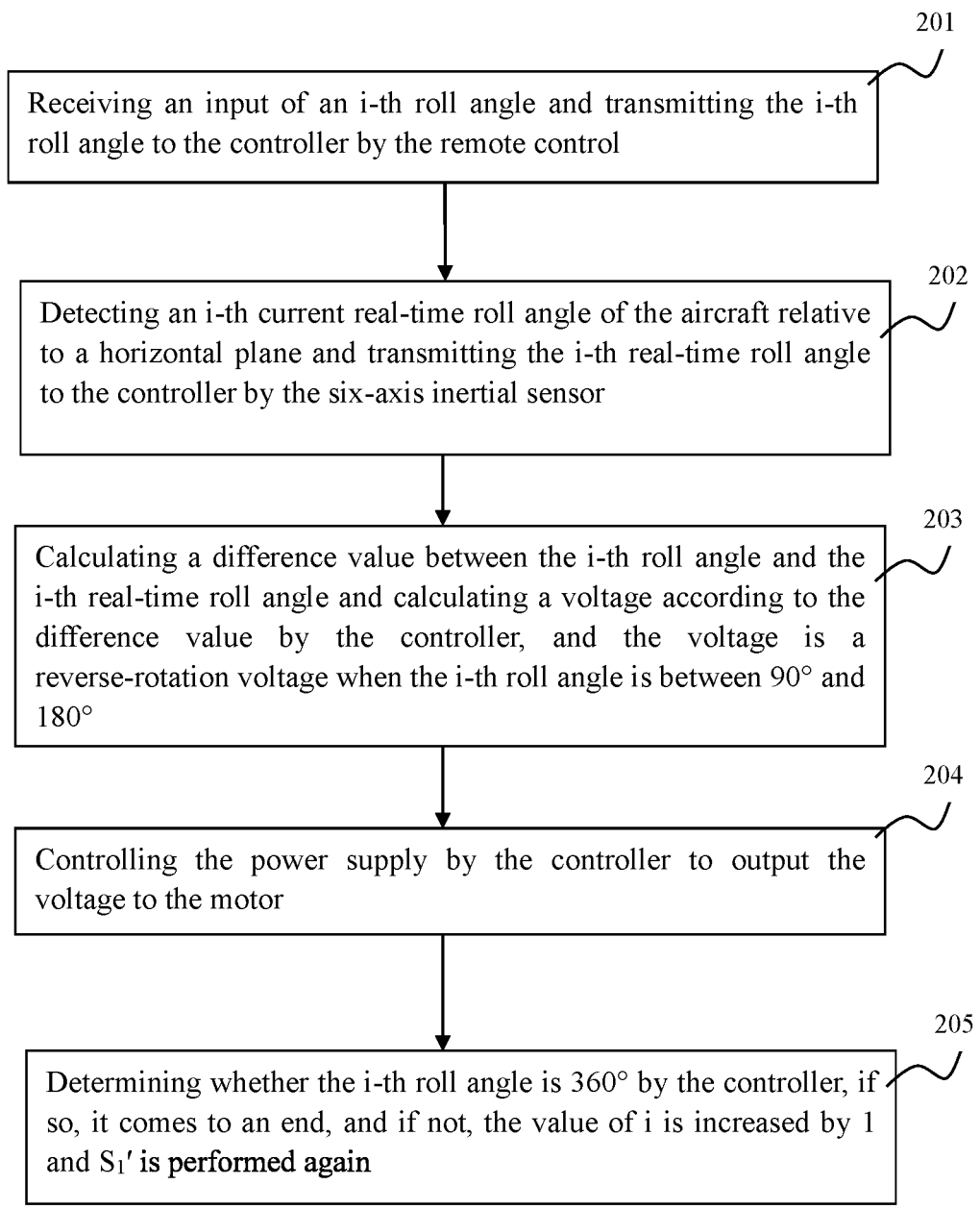
FIG. 3 schematically shows a roll method of the aircraft according to the Embodiment 1 of the present disclosure.

As shown in FIG. 3, a roll method of an aircraft is further provided in the present embodiment, which can be performed by the aircraft with the above-described configuration. When the roll angle is 360°, a value of i is set to be 1, and the method comprises steps of:

Step 201, receiving an input of an i-th roll angle and transmitting the i-th roll angle to the controller by the remote control;

Step 202, detecting an i-th current real-time roll angle of the aircraft relative to a horizontal plane and transmitting the i-th real-time roll angle to the controller by the six-axis inertial sensor;

Step 203, calculating a difference value between the i-th roll angle and the i-th real-time roll angle and calculating a voltage according to the difference value by the controller, wherein the voltage is a reverse-rotation voltage when the i-th roll angle is between 90° and 180°;

Step 204, controlling the H-bridge chip by the controller so that the voltage is input to the motor;

Step 205, determining whether the i-th roll angle is 360° by the controller. If so, it comes to an end. If not, a value of i is increased by one and $S_1'$-$S_4'$ are performed again.

In the following, a specific example is provided for a person skilled in the art to better understand the present disclosure.

When a user intends to roll an aircraft to an attitude with a roll angle of 360°, instead of directly inputting 360° or press a button indicating 360° on the remote control 1 so that the aircraft can directly roll to the attitude with the roll angle of 360°, the user may input a roll angle of 45° on the remote control 1 at first. The remote control 1 may transmit the roll angle of 45° to the controller 2 after receiving the roll angle of 45° input by the user. Meanwhile, the six-axis inertial sensor 4 may detect the current roll angle of the aircraft relative to the horizontal plane, and transmit the real-time roll angle to the controller 2.

The controller 2 may calculate the difference value between the roll angle of 45° and the real-time roll angle, and calculate a voltage according to the difference value. Then, the controller 2 may control the H-bridge chip 5 so that the voltage is input to the motor 6, causing the motor 6 to rotate forwardly and thus the aircraft can roll to an attitude with the roll angle of 45°.

Then, the user may input a roll angle again, for example input a roll angle of 90°, and the aircraft will roll in the sky to an attitude with the roll angle of 90° within 50 milliseconds. The user may input a roll angle of 135°, 180°, 225° and 360° in turn, and finally, the aircraft can roll in the sky to the attitude with the roll angle of 360°.

The above technical solution has advantages as follows: (1) by preventing the aircraft from rolling too fast, which may result in a bad visual experience and thus a false impression of the user that the aircraft fails to roll, an "elegant" roll of the aircraft and a good visual experience can be achieved; and (2) by preventing the aircraft from rolling too fast and too strongly, a fall of the aircraft can be prevented.

Individual functional modules can be implemented by existing hardware and software programming means. Therefore, specific implementations thereof will not be described herein.

Although specific embodiments of the present disclosure have been described, a person skilled in the art will appreciate that these embodiments are only examples and can make various modifications and alternatives without going beyond the principles of the present disclosure. Therefore, the protection scope of the present disclosure is defined by claims.

What is claimed is:

1. An aircraft comprising an aircraft body and a remote control, wherein the aircraft body comprises a motor and a power supply, wherein the aircraft body further comprises a controller, a six-axis inertial sensor, and an H-bridge chip which is configured to be electrically connected in parallel to the motor;
   the remote control is configured for a user to input a desired roll angle for the aircraft, and is configured to transmit the desired roll angle to the controller, wherein the desired roll angle is 180° or 360°;
   the six-axis inertial sensor is configured to detect a current real-time roll angle of the aircraft relative to a horizontal plane, and transmit the real-time roll angle to the controller;
   the controller is configured to calculate a difference value between the desired roll angle and the real-time roll angle, calculate a reverse-rotation voltage according to the difference value,
   and control the H-bridge chip to input the reverse-rotation voltage to the motor so as to roll the aircraft with 180° or 360°, wherein the aircraft is a multi-rotor aircraft.

2. The aircraft of claim 1, wherein the controller is further configured to control the H-bridge chip to generate an electromagnetic braking force to decelerate the motor.

3. The aircraft of claim 2, wherein the controller is further configured to control the H-bridge chip to change a value and direction of a voltage input to the motor from the power supply, causing the motor to operate with a constant or increased speed.

4. The aircraft of claim 1, wherein when the desired roll angle is 360°, a value of i is set to be 1, and the remote control is configured to receive an input of an i-th roll angle and transmit the i-th roll angle to the controller;
   the six-axis inertial sensor is configured to detect an i-th current real-time roll angle of the aircraft relative to the horizontal plane, and transmit the i-th real-time roll angle to the controller;
   the controller is configured to calculate a difference value between the i-th roll angle and the i-th real-time roll angle, and calculate a voltage according to the difference value, wherein the voltage is a reverse-rotation voltage when the i-th roll angle is between 90° and 180°;
   the controller is further configured to control the H-bridge chip so that the voltage is input to the motor; and
   the controller is further configured to determine whether the i-th roll angle is 360°, if so, it comes to an end, and if not, the value of i is increased by 1 and the remote control is called.

5. The aircraft of claim 1, wherein the aircraft is a four-rotor aircraft, a six-rotor aircraft or an eight-rotor aircraft.

6. The aircraft of claim 2, wherein when the desired roll angle is 360°, a value of i is set to be 1, and the remote control is configured to receive an input of an i-th roll angle and transmit the i-th roll angle to the controller;
   the six-axis inertial sensor is configured to detect an i-th current real-time roll angle of the aircraft relative to the horizontal plane, and transmit the i-th real-time roll angle to the controller;
   the controller is configured to calculate a difference value between the i-th roll angle and the i-th real-time roll angle, and calculate a voltage according to the difference value, wherein the voltage is a reverse-rotation voltage when the i-th roll angle is between 90° and 180°;
   the controller is further configured to control the H-bridge chip so that the voltage is input to the motor; and
   the controller is further configured to determine whether the i-th roll angle is 360°, if so, it comes to an end, and if not, the value of i is increased by 1 and the remote control is called.

7. The aircraft of claim 2, wherein the aircraft is a four-rotor aircraft, a six-rotor aircraft or an eight-rotor aircraft.

8. The aircraft of claim 3, wherein when the desired roll angle is 360°, a value of i is set to be 1, and the remote control is configured to receive an input of an i-th roll angle and transmit the i-th roll angle to the controller;
   the six-axis inertial sensor is configured to detect an i-th current real-time roll angle of the aircraft relative to the horizontal plane, and transmit the i-th real-time roll angle to the controller;
   the controller is configured to calculate a difference value between the i-th roll angle and the i-th real-time roll angle, and calculate a voltage according to the difference value, wherein the voltage is a reverse-rotation voltage when the i-th roll angle is between 90° and 180°;
   the controller is further configured to control the H-bridge chip so that the voltage is input to the motor; and
   the controller is further configured to determine whether the i-th roll angle is 360°, if so, it comes to an end, and if not, the value of i is increased by 1 and the remote control is called.

9. The aircraft of claim 3, wherein the aircraft is a four-rotor aircraft, a six-rotor aircraft or an eight-rotor aircraft.

10. The aircraft of claim 4, wherein the aircraft is a four-rotor aircraft, a six-rotor aircraft or an eight-rotor aircraft.

11. A roll method for an aircraft, wherein the aircraft comprises an aircraft body and a remote control, and the aircraft body comprises a motor and a power supply, and further comprises a controller, a six-axis inertial sensor, and an H-bridge chip which is configured to be electrically connected in parallel to the motor, the method comprises steps of:
   $S_1$, inputting a desired roll angle for the aircraft by a user on the remote control, and transmitting the desired roll angle to the controller by the remote control, wherein the desired roll angle is 180° or 360°;
   $S_2$, detecting a current real-time roll angle of the aircraft relative to a horizontal plane and transmitting the real-time roll angle to the controller by the six-axis inertial sensor;
   $S_3$, calculating a difference value between the desired roll angle and the real-time roll angle and calculating a reverse-rotation voltage for the motor according to the difference value by the controller; and S₄, controlling the H-bridge chip by the controller to input the reverse-rotation voltage to the motor so as to roll the aircraft with 180° or 360°, wherein the aircraft is a multi-rotor aircraft.

12. The roll method of claim 11, wherein in S₄, further controlling the H-bridge chip by the controller to generate an electromagnetic braking force to decelerate the motor.

13. The roll method of claim 12, further comprises a step of controlling the H-bridge chip by the controller to change a value and direction of a voltage input to the motor from the power supply, causing the motor to operate with a constant or increased speed.

14. The roll method of claim 11, wherein when the desired roll angle is 360°, a value of i is set to be 1, and the method comprises steps of:

$S_1'$, receiving an input of an i-th roll angle and transmitting the i-th roll angle to the controller by the remote control;

$S_2'$, detecting an i-th current real-time roll angle of the aircraft relative to the horizontal plane and transmitting the i-th real-time roll angle to the controller by the six-axis inertial sensor;

$S_3'$, calculating a difference value between the i-th roll angle and the i-th real-time roll angle and calculating a voltage according to the difference value by the controller, wherein the voltage is a reverse-rotation voltage when the i-th roll angle is between 90° and 180°;

$S_4'$, controlling the H-bridge chip by the controller so that the voltage is input to the motor; and $S_5'$, determining whether the i-th roll angle is 360° by the controller, if so, it comes to an end, and if not, the value of i is increased by 1 and $S_1'$-$S_4'$ are performed again.

15. The roll method of claim 12, wherein when the desired roll angle is 360°, a value of i is set to be 1, and the method comprises steps of:

$S_1'$, receiving an input of an i-th roll angle and transmitting the i-th roll angle to the controller by the remote control;

$S_2'$, detecting an i-th current real-time roll angle of the aircraft relative to the horizontal plane and transmitting the i-th real-time roll angle to the controller by the six-axis inertial sensor;

$S_3'$, calculating a difference value between the i-th roll angle and the i-th real-time roll angle and calculating a voltage according to the difference value by the controller, wherein the voltage is a reverse-rotation voltage when the i-th roll angle is between 90° and 180°;

$S_4'$, controlling the H-bridge chip by the controller so that the voltage is input to the motor; and $S_5'$, determining whether the i-th roll angle is 360° by the controller, if so, it comes to an end, and if not, the value of i is increased by 1 and $S_1'$-$S_4'$ are performed again.

16. The roll method of claim 13, wherein when the desired roll angle is 360°, a value of i is set to be 1, and the method comprises steps of:

$S_1'$, receiving an input of an i-th roll angle and transmitting the i-th roll angle to the controller by the remote control;

$S_2'$, detecting an i-th current real-time roll angle of the aircraft relative to the horizontal plane and transmitting the i-th real-time roll angle to the controller by the six-axis inertial sensor;

$S_3'$, calculating a difference value between the i-th roll angle and the i-th real-time roll angle and calculating a voltage according to the difference value by the controller, wherein the voltage is a reverse-rotation voltage when the i-th roll angle is between 90° and 180°;

$S_4'$, controlling the H-bridge chip by the controller so that the voltage is input to the motor; and $S_5'$, determining whether the i-th roll angle is 360° by the controller, if so, it comes to an end, and if not, the value of i is increased by 1 and $S_1'$-$S_4'$ are performed again.

17. A roll method for an aircraft, wherein the aircraft comprises an aircraft body and a remote control, and the aircraft body comprises a motor and a power supply, and further comprises a controller, a six-axis inertial sensor, and an H-bridge chip which is configured to be electrically connected in parallel to the motor, the method comprises steps of:

$S_1$, inputting a desired roll angle for the aircraft by a user on the remote control, and transmitting the desired roll angle to the controller by the remote control, wherein the desired roll angle is 180° or 360°;

$S_2$, detecting a current real-time roll angle of the aircraft relative to a horizontal plane and transmitting the real-time roll angle to the controller by the six-axis inertial sensor;

$S_3$, calculating a difference value between the desired roll angle and the real-time roll angle and calculating a reverse-rotation voltage for the motor according to the difference value by the controller; and $S_4$, controlling the H-bridge chip by the controller to input the reverse-rotation voltage to the motor so as to roll the aircraft with 180° or 360°, wherein the aircraft is a four-rotor aircraft, a six-rotor aircraft or an eight-rotor aircraft.

18. The roll method of claim 17, wherein in $S_4$, further controlling the H-bridge chip by the controller to generate an electromagnetic braking force to decelerate the motor.

19. The roll method of claim 18, further comprises a step of controlling the H-bridge chip by the controller to change a value and direction of a voltage input to the motor from the power supply, causing the motor to operate with a constant or increased speed.

20. The roll method of claim 17, wherein when the desired roll angle is 360°, a value of i is set to be 1, and the method comprises steps of:

$S_1'$, receiving an input of an i-th roll angle and transmitting the i-th roll angle to the controller by the remote control;

$S_2'$, detecting an i-th current real-time roll angle of the aircraft relative to the horizontal plane and transmitting the i-th real-time roll angle to the controller by the six-axis inertial sensor;

$S_3'$, calculating a difference value between the i-th roll angle and the i-th real-time roll angle and calculating a voltage according to the difference value by the controller, wherein the voltage is a reverse-rotation voltage when the i-th roll angle is between 90° and 180°;

$S_4'$, controlling the H-bridge chip by the controller so that the voltage is input to the motor; and $S_5'$, determining whether the i-th roll angle is 360° by the controller, if so, it comes to an end, and if not, the value of i is increased by 1 and $S_1'$-$S_4'$ are performed again.

* * * * *